United States Patent
Yamaguchi et al.

(10) Patent No.: US 7,882,619 B2
(45) Date of Patent: Feb. 8, 2011

(54) METHOD FOR SETTING STATOR COIL

(75) Inventors: Kazuyuki Yamaguchi, Kariya (JP);
 Tetsuya Koyama, Kariya (JP); Yusuke Niimi, Kariya (JP); Kenji Yoshida, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 692 days.

(21) Appl. No.: 11/818,699

(22) Filed: Jun. 14, 2007

(65) Prior Publication Data
 US 2008/0012433 A1 Jan. 17, 2008

(30) Foreign Application Priority Data
 Jun. 15, 2006 (JP) ............................ 2006-166488

(51) Int. Cl.
 *H02K 15/085* (2006.01)
(52) U.S. Cl. .............................. 29/606; 29/596; 29/735
(58) Field of Classification Search .................. 29/596, 29/606, 732, 735
 See application file for complete search history.

(56) References Cited

U.S. PATENT DOCUMENTS 2,432,267 A * 12/1947 Adamson ...................... 29/596

FOREIGN PATENT DOCUMENTS

| JP | 9-084309 | 3/1997 |
| JP | 10-042527 | 2/1998 |
| JP | 10-084660 | 3/1998 |
| JP | 11-234979 | 8/1999 |
| JP | 2005-080356 | 3/2005 |
| JP | 2005-184887 | 7/2005 |

\* cited by examiner

*Primary Examiner*—A. Dexter Tugbang
*Assistant Examiner*—Livius R Cazan
(74) *Attorney, Agent, or Firm*—Locke Lord Bissell & Liddell LLP (57) ABSTRACT

Stator coils are inclined with respect to the axial direction of annularly arranged coil holding portions and such that at least parts of the stator coils overlap one another. In setting the stator coils on the coil holder, the stator coils are sequentially set on the coil holder in a predetermined direction, which is a coil setting direction, from the starting stator coil so as to overlap one another. The second section of the ending stator coil is set at the same position as a position where the first section of the starting stator coil is set in the circumferential direction or at a position advanced from the position where the first section of the starting stator coil is set in the circumferential direction. The ending stator coil is set on the coil holder to be further inward than the starting stator coil. Therefore, stator coils are evenly arranged.

3 Claims, 11 Drawing Sheets

METHOD FOR SETTING STATOR COIL

BACKGROUND OF THE INVENTION

The present invention relates to a method and an apparatus for setting stator coils on a blade of an inserter. Furthermore, the present invention pertains to a method for manufacturing a rotating electrical machine including a stator core about which stator coils are wound.

A stator used for a rotating electrical machine such as an electric motor and a generator has a stator core including teeth. Stator coils are inserted in slots formed between the teeth. Japanese Patent No. 3448204, Japanese Patent No. 3144759, Japanese Patent No. 3673330, Japanese Patent No. 3673337, and Japanese Laid-Open Patent Publication No. 2005-184887 disclose methods for winding stator coils. In these methods, the stator coils are wound around a stator core such that each stator coil extends over a number of teeth. The stator coils overlap one another to form a spiral shape as a whole.

Japanese Laid-Open Patent Publication No. 2005-80356 discloses a method for inserting stator coils in slots of a stator core using an inserter.

In a case where the stator coils are inserted in the slots of the stator core using the inserter, the stator coils that are formed into a predetermined shape in advance need to be set on a blade of the inserter. In order to apply the inserter to the methods disclosed in the above-mentioned Japanese Patent No. 3448204, etc., it is necessary to set, on the blade, the stator coils that are formed into a shape that permits the stator coils to overlap one another to form a spiral shape when inserted in the slots of the stator.

However, in the conventional methods, since the stator coils are manually arranged on the blade, the arrangement of the stator coils inserted in the slots tends to be uneven. In particular, unevenness in the arrangement is significant at the region where the stator coil that is set on the blade first overlaps the stator coil that is set on the blade last. The uneven arrangement of the stator coils reduces the efficiency of the rotating electrical machine.

The above-mentioned Japanese Patent No. 3144759, Japanese Patent No. 3673330, Japanese Patent No. 3673337, and the Japanese Laid-Open Patent Publication No. 2005-184887 disclose methods for mounting the stator coils on the stator core without using an inserter. The above-mentioned Japanese Patent No. 3144759 discloses a stator core, which is manufactured by combining a yoke with an iron core. The iron core includes an inner cylinder and protrusions, which extend radially outward from the inner cylinder. The protrusions are arranged at equal intervals in the circumferential direction. After sequentially setting the stator coils on the protrusions, the iron core is fitted in the yoke, which forms an outer cylinder. In this case, the inserter need not be used.

Furthermore, the above-mentioned Japanese Patent No. 3673330, Japanese Patent No. 3673337, and Japanese Laid-Open Patent Publication No. 2005-184887 disclose methods for manufacturing a single stator core by combining divided cores. More specifically, the stator core is manufactured by setting the stator coils, which are formed into a predetermined shape, on the divided cores in advance, and thereafter combining the divided cores. In this case also, the inserter need not be used. However, the stator core manufactured by combining the iron core and the yoke or the stator core manufactured by combining the divided cores reduces the efficiency of the rotating electrical machine as compared to an integrated stator core.

Accordingly, it is an objective of the present invention to evenly arrange stator coils when the stator coils are mounted on a stator core using an inserter in a state where the stator coils overlap one another to form a spiral shape.

SUMMARY OF THE INVENTION

According to one aspect of the invention, a method for setting a plurality of stator coils on an inserting blade before mounting the stator coils on a stator core using the inserting blade such that the stator coils overlap one another to form a spiral shape is provided. The method comprising setting the stator coils on a coil holder. The coil holder includes a plurality of coil holding portions for retaining a first section and a second section of each stator coil. The coil holding portions are arranged at equal pitches in an annular shape. A phase difference is generated between a position of the coil holder where the first section is set and a position of the coil holder where the second section is set. The stator coils are set on the coil holder such that the stator coils are inclined with respect to the axial direction of the annularly arranged coil holding portions and such that at least parts of the stator coils overlap one another. The stator coils include a starting stator coil and an ending stator coil. The starting stator coil is set on the coil holder first. In setting the stator coils on the coil holder, the stator coils are sequentially set on the coil holder in a predetermined direction, which is a coil setting direction, from the starting stator coil so as to overlap one another. The second section of the ending stator coil is set at the same position as a position where the first section of the starting stator coil is set in the circumferential direction or at a position advanced from the position where the first section of the starting stator coil is set in the circumferential direction. The ending stator coil is set on the coil holder to be further inward than the starting stator coil.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

A first embodiment of the present invention will now be described with reference to FIGS. 1 to 11.

Figure 1:
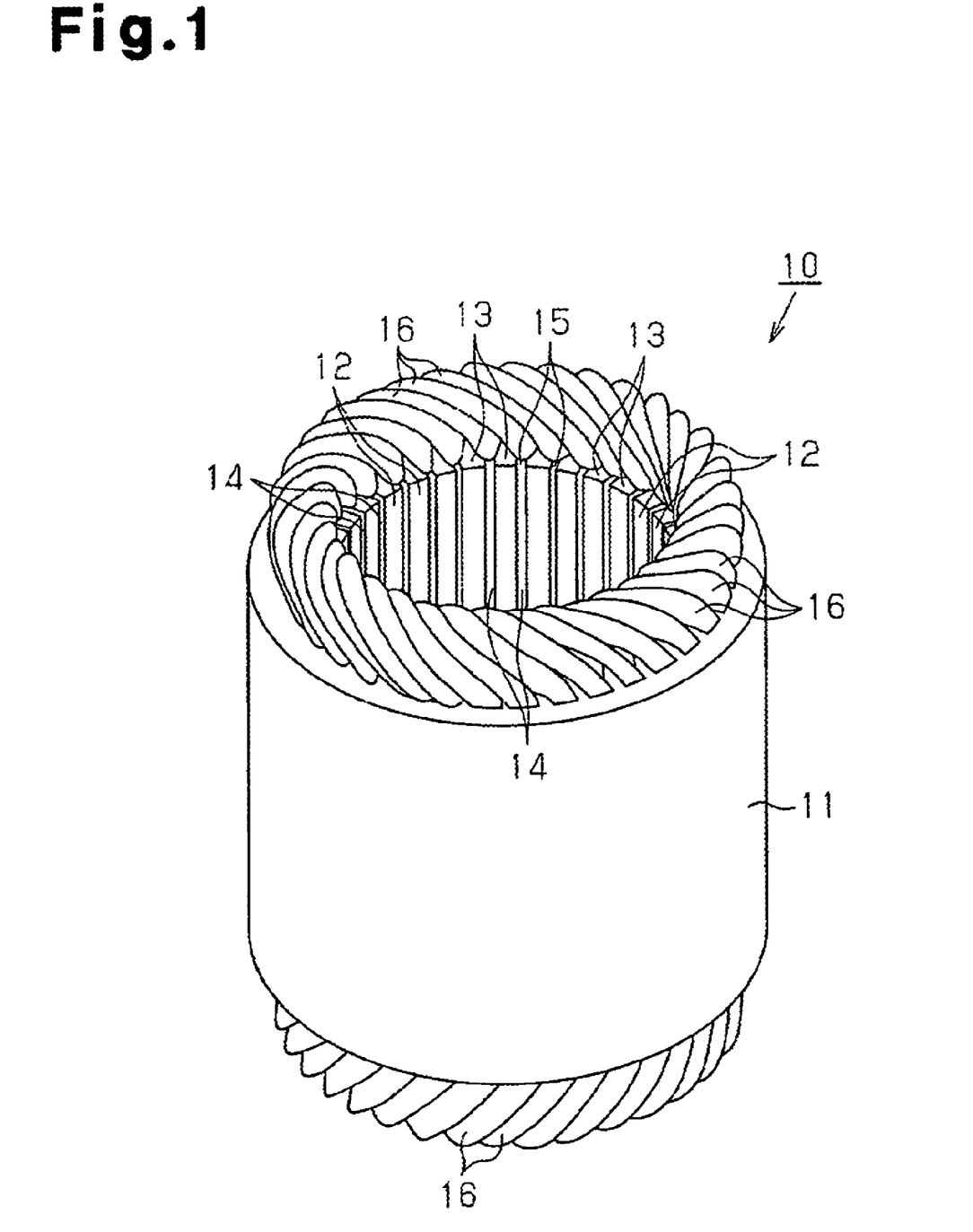
FIG. 1 is a perspective view illustrating a stator manufactured by a method according to a first embodiment of the present invention, and the stator includes a stator core around which stator coils are wound.

FIG. 1 shows a stator 10 used in a rotating electrical machine such as an electric motor and a generator. Teeth 12, which project radially inward, are formed on the inner circumferential portion of a stator core 11. The teeth 12 are arranged at equal pitches in the circumferential direction. The stator core 11 of the first embodiment is an integral part, and is not manufactured by combining divided cores. The teeth 12 are T-shaped as viewed in the axial direction. That is, a radially inner end of each tooth 12 has a pair of protrusions 13, which protrude in both circumferential directions. Slots 14 are formed between the teeth 12. The slots 14 extend in the axial direction of the stator core 11. An opening portion 15 of each slot 14 is defined between an adjacent pair of the protrusions 13.

Stator coils 16 are mounted on the stator core 11. Each stator coil 16 is formed by a conductive wire wound into an annular shape. Each stator coil 16 is mounted on the stator core 11 so as to extend over a predetermined number of the teeth 12. Each stator coil 16 includes an inner section, which extends along a radially inward section of the stator core 11, and an outer section, which extends along a radially outward section of the stator core 11. The inner section of each stator coil 16 is arranged in the vicinity of the opening portion 15 of the corresponding slot 14. The outer section of each stator coil 16 is arranged at the innermost portion of the corresponding slot 14. Each stator coil 16 bulges from the inner section toward the outer section. Each adjacent pair of the stator coils 16 closely contact each other. Thus, the stator coils 16 are mounted on the stator core 11 such that the stator coils 16 overlap one another to form a spiral shape as a whole.

The stator coils 16 are inserted in the slots 14 of the stator core 11 using an inserter so as to be mounted on the stator core 11. The stator coils 16 are set on an inserting blade 20 (shown in FIG. 2) of the inserter, and are inserted in the stator core 11 via the inserting blade 20.

FIGS. 2 to 11 show a procedure for setting the stator coils 16 on the inserting blade 20. In the first embodiment, the stator coils 16 are not set on a coil setting jig, but are directly set on the inserting blade 20. The stator coils 16 are formed on the inserting blade 20 such that the stator coils 16 overlap one another to form a spiral shape as a whole. The inserting blade 20 of the first embodiment functions as a coil holder.

Figure 2:
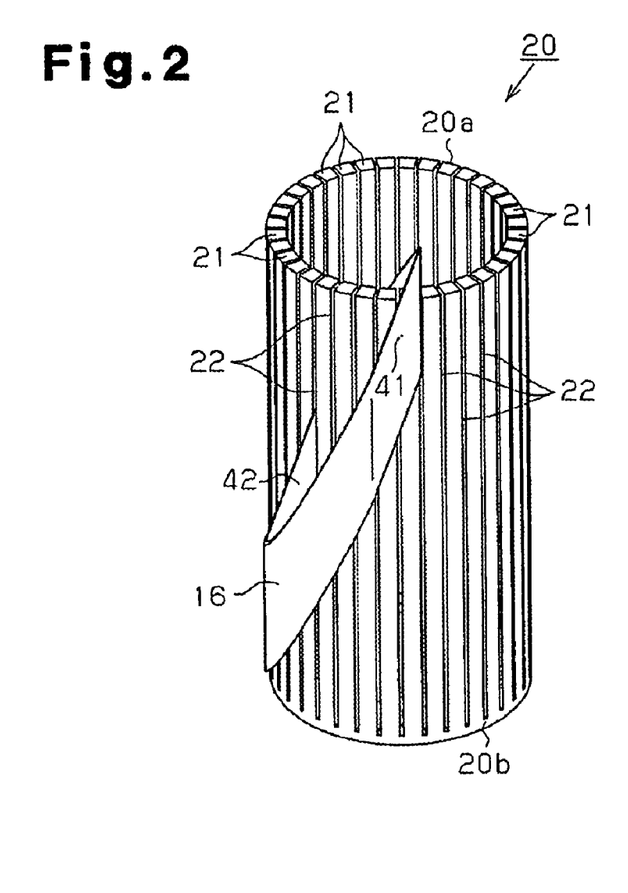
FIG. 2 is a perspective view illustrating an inserting blade of the first embodiment.

As shown in FIG. 2, the cylindrical inserting blade 20 includes long blade members 21. The blade members 21 are arranged at equal pitches in an annular shape. The inserting blade 20 has slits 22, which extend in the axial direction (longitudinal direction) of the inserting blade 20. Each slit 22 is defined between adjacent blade members 21. As shown in FIG. 2, all the slits 22 are open at a first end 20a of the inserting blade 20 and are closed at a second end 20b of the inserting blade 20. The inserting blade 20 of the first embodiment is arranged such that the first end 20a is located above the second end 20b. The inserting blade 20 does not need to extend in the vertical direction, but may extend in the left and right direction. As the stator coils 16 are inserted in the slits 22, coil holding portions, which are the blade members 21 in the first embodiment, retain the stator coils 16. The arrangement pitch of the blade members 21, that is, the arrangement pitch of the slits 22 correlates with the arrangement pitch of the teeth 12 of the stator core 11. The arrangement pitch of the slits 22 corresponds to half the arrangement pitch of the slots 14 of the stator core 11. That is, the number of the slits 22 is twice the number of the slots 14 of the stator core 11.

Figure 3:
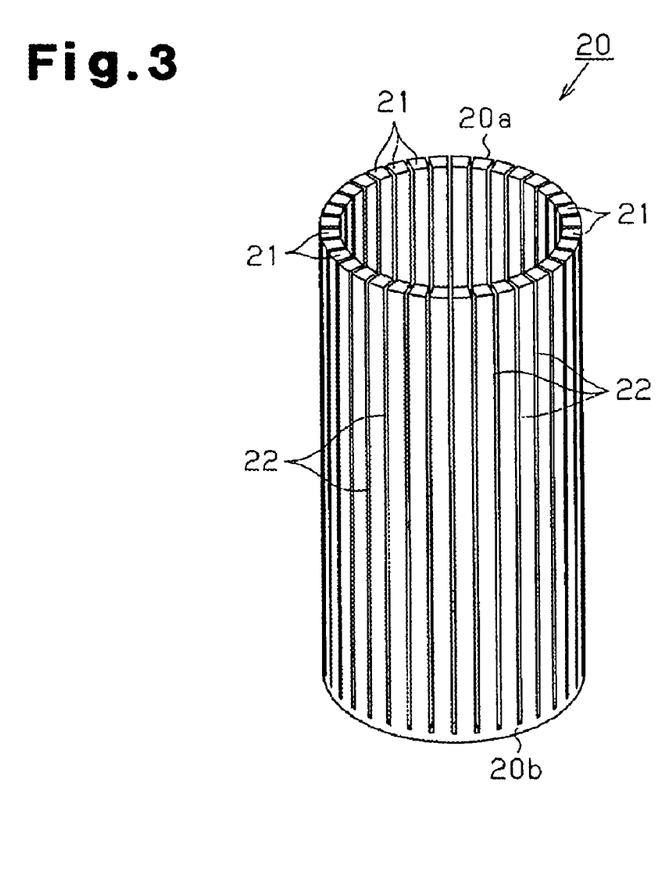
FIG. 3 is a perspective view illustrating a state where a first stator coil is set on the inserting blade of FIG. 2.

The stator coils 16 are sequentially set on the inserting blade 20. Each stator coil 16 includes a first section 41, which is inserted in one of the slits 22, and a second section 42, which is inserted in the slit 22 that is apart from the slit 22 in which the first section 41 is inserted by a predetermined number of the arrangement pitches. That is, there is a phase difference between the position where the first section 41 of each stator coil 16 is set and the position where the second section 42 of the stator coil 16 is set. FIG. 3 shows a state in which five blade members 21, that is, four slits 22 are located between the first section 41 and the second section 42. The first section 41 is set on the inserting blade 20 so as to be displaced from the second section 42 in the vertical direction, that is, in the longitudinal direction of the inserting blade 20. In FIG. 3, the first section 41 is arranged above the second section 42. The first section 41 is arranged in the vicinity of the first end 20a of the inserting blade 20, and the second section 42 is arranged in the vicinity of the second end 20b. That is, the second section 42 is arranged at the innermost part of the slit 22. In this manner, the stator coils 16 are set on the inserting blade 20 in a state where the stator coils 16 are inclined with respect to the axial direction of the inserting blade 20.

The arrangement pitch of the slits 22 corresponds to the distance between adjacent teeth 12 of the stator core 11, that is, the distance between adjacent slots 14. The interval between the first section 41 and the second section 42 of each stator coil 16 set on the stator core 11 is determined in accordance with the number of the teeth 12 over which the stator coil 16 will extend. That is, the interval between the slit 22 in which the first section 41 is inserted and the slit 22 in which the second section 42 is inserted is determined in accordance with the distance between adjacent slots 14 and in accordance with the specification of the electric motor or the rotating electric machine. The interval between the first section 41 and the associated second section 42 is also determined in accordance with the number of the stator coils 16 that overlap any of the stator coils 16 on the stator core 11.

Figure 4:
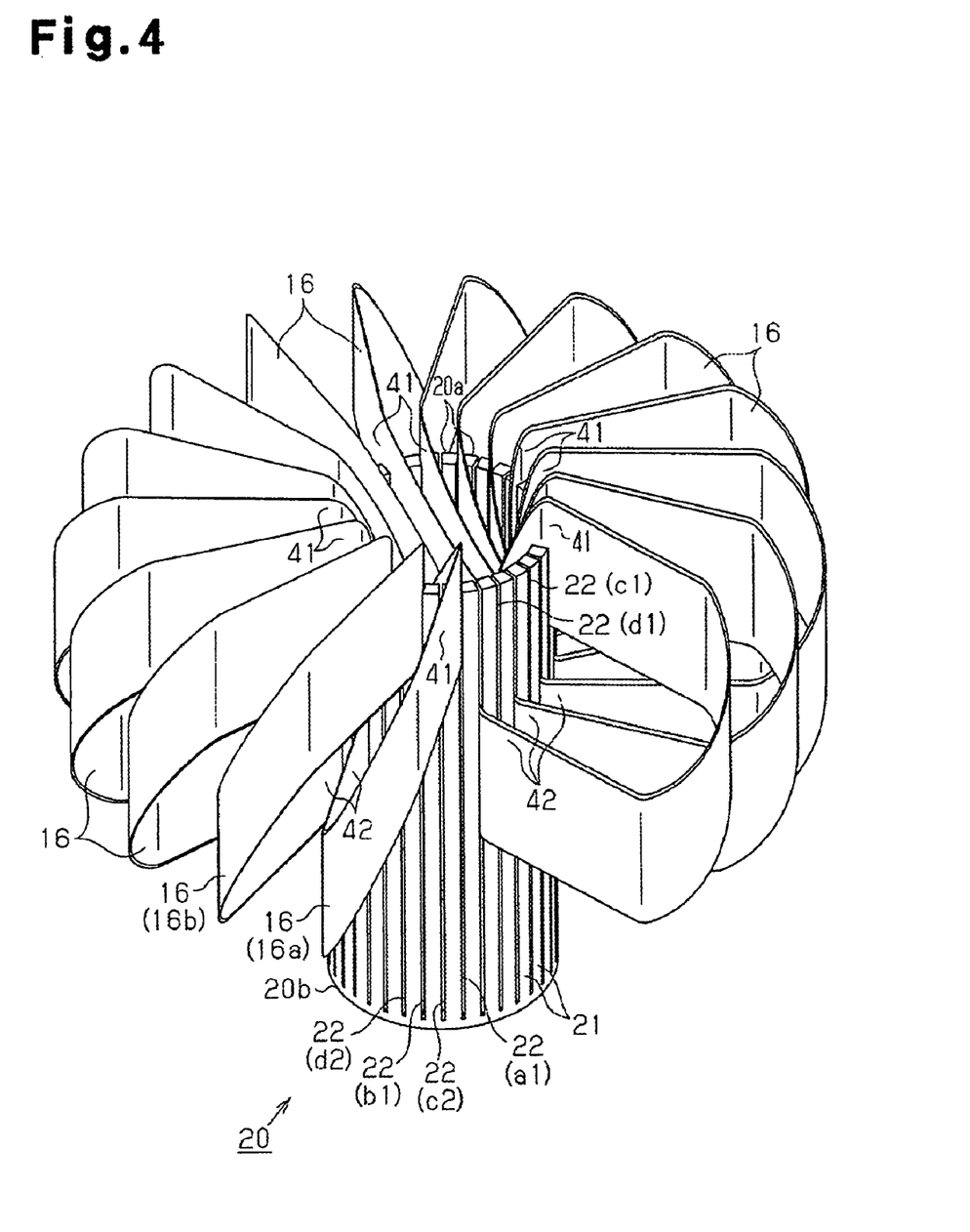
FIG. 4 is a perspective view illustrating a state where all the stator coils except a third stator coil and a fourth stator coil are set on the inserting blade of FIG. 3.

The stator coils 16 are sequentially set in a coil setting direction, which is a predetermined direction in the first embodiment, that is, clockwise in FIG. 4. The stator coils 16 are set on the inserting blade 20 so as to be inclined with respect to the inserting blade 20 and so that the adjacent stator coils 16 partially overlap each other.

As shown in FIG. 4, the stator coils 16 are sequentially set until the number of the remaining stator coils 16 to be set on the inserting blade 20 is two.

The stator coil 16 that is set on the inserting blade 20 first is referred to as a first stator coil 16a, and the stator coil 16 that is set secondly is referred to as a second stator coil 16b. The stator coil 16 that is set on the inserting blade 20 second last is referred to as a third stator coil 16c, and the stator coil 16 that is set on the inserting blade 20 last is referred to as a fourth stator coil 16d. In the first embodiment, the first and second stator coils 16a, 16b correspond to starting stator coils, and the third and fourth stator coils 16c, 16d correspond to ending stator coils.

FIG. 3 shows a state where the first stator coil 16a is set on the inserting blade 20. FIG. 4 shows a state where all the stator coils 16 except the third stator coil 16c and the fourth stator coil 16d are set on the inserting blade 20.

As shown in FIG. 4, the first stator coil 16a is adjacent to the second stator coil 16b. The third stator coil 16c is adjacent to the fourth stator coil 16d. The fourth stator coil 16d is adjacent to the first stator coil 16a. The third stator coil 16c overlaps the fourth stator coil 16d and the first stator coil 16a. That is, the second section 42 of the third stator coil 16c overlaps the first section 41 of the fourth stator coil 16d and the first section 41 of the first stator coil 16a. The fourth stator coil 16d overlaps the first stator coil 16a and the second stator coil 16b. That is, the second section 42 of the fourth stator coil 16d overlaps the first section 41 of the first stator coil 16a and the first section 41 of the second stator coil 16b.

Thus, when setting the third stator coil 16c on the inserting blade 20, the first stator coil 16a might get in the way. Furthermore, when setting the fourth stator coil 16d on the inserting blade 20, the first stator coil 16a and the second stator coil 16b might get in the way.

Figure 9:
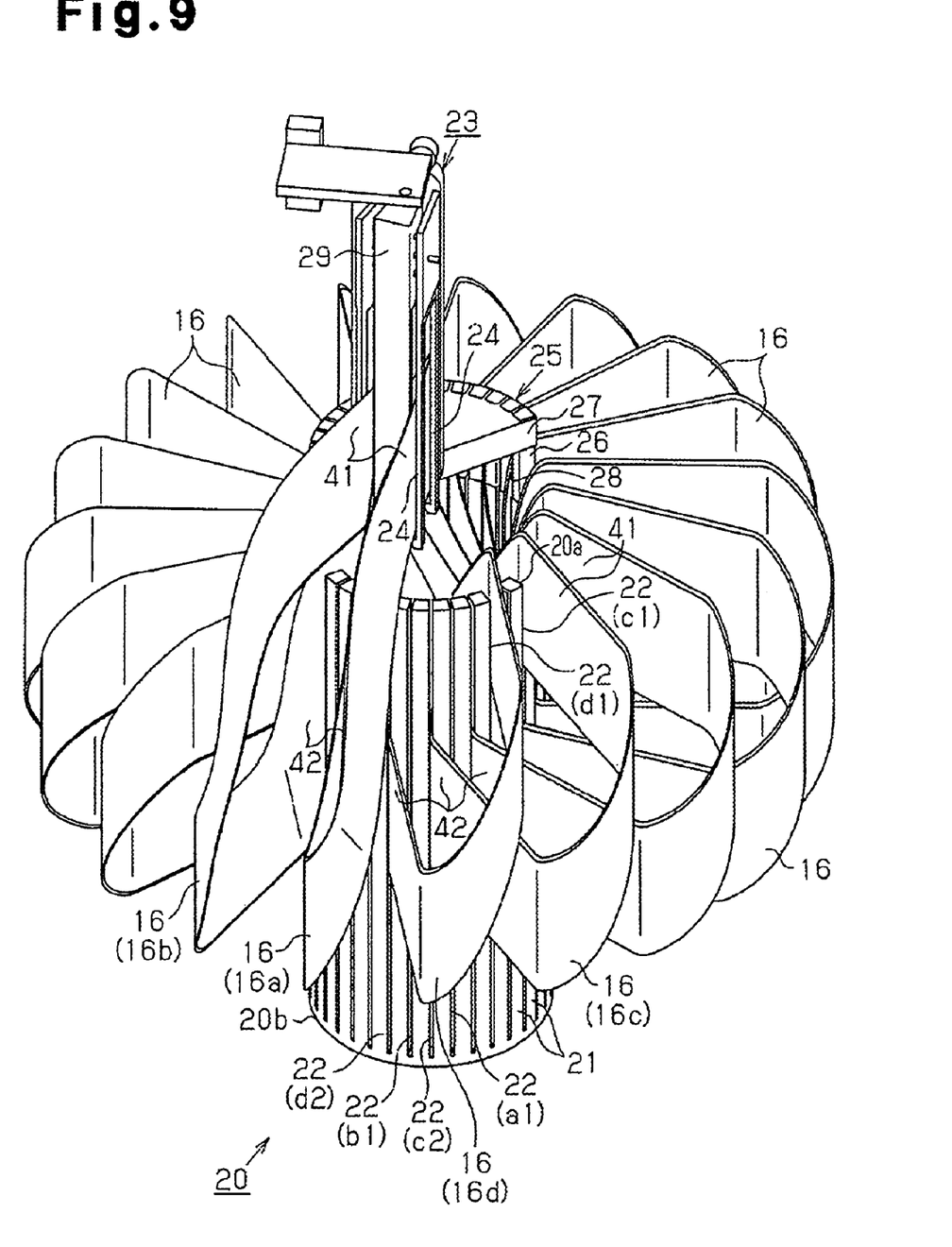
FIG. 9 is a perspective view illustrating a state where the fourth stator coil is set on the inserting blade of FIG. 8.

More specifically, as shown in FIG. 9, a third slit 22c2 in which the second section 42 of the third stator coil 16c is set is located at a position that is advanced in the coil setting direction (clockwise) from a first slit 22a1 in which the first stator coil 16a is set. A fourth slit 22d2 in which the second section 42 of the fourth stator coil 16d is set is located at a position advanced in the coil setting direction from the first slit 22a1 in which the first stator coil 16a is set and the second slit 22b1 in which the second stator coil 16b is set. If the second section 42 of the third stator coil 16c is inserted in the third slit 22c2 of FIG. 4, the second section 42 of the third stator coil 16c interferes with the first stator coil 16a that has already been inserted in the first slit 22b1. Furthermore, if the second section 42 of the fourth stator coil 16d is inserted in the fourth slit 22d2 of FIG. 4, the second section 42 of the fourth stator coil 16d interferes with the first stator coil 16a that has already been inserted in the first slit 22a1 and the second stator coil 16b that has already been inserted in the second slit 22b1.

The first section 41 of the third stator coil 16c is set in a slit 22c1, and the first section 41 of the fourth stator coil 16d is set in a slit 22d1. The slit 22c1, the slit 22d1, the first slit 22a1, the third slit 22c2, the second slit 22b1, and the fourth slit 22d2 are arranged in the coil setting direction (clockwise) in this order. One slit 22 is located between the slit 22c1 and the slit 22d1, and one slit 22 is also located between the slit 22d1 and the first slit 22b1. However, no slit 22 exists between the first slit 22a1 and the third slit 22c2, between the third slit 22c2 and the second slit 22b1, and between the second slit 22b1 and the fourth slit 22d2.

According to the coil setting method of the first embodiment, as shown in FIG. 4, after setting all the stator coils 16 other than the third and fourth stator coils 16c, 16d on the inserting blade 20, the first sections 41 of the first and second stator coils 16a, 16b are temporarily removed from the first and second slits 22a1, 22b1. That is, the first and second stator coils 16a, 16b are temporarily retracted from the inserting blade 20. In other words, the first sections 41 of the first and second stator coils 16a, 16b are temporarily lifted from the inserting blade 20 while maintaining the state where the second sections 42 of the first and second stator coils 16a, 16b are set on the inserting blade 20.

Figure 5:
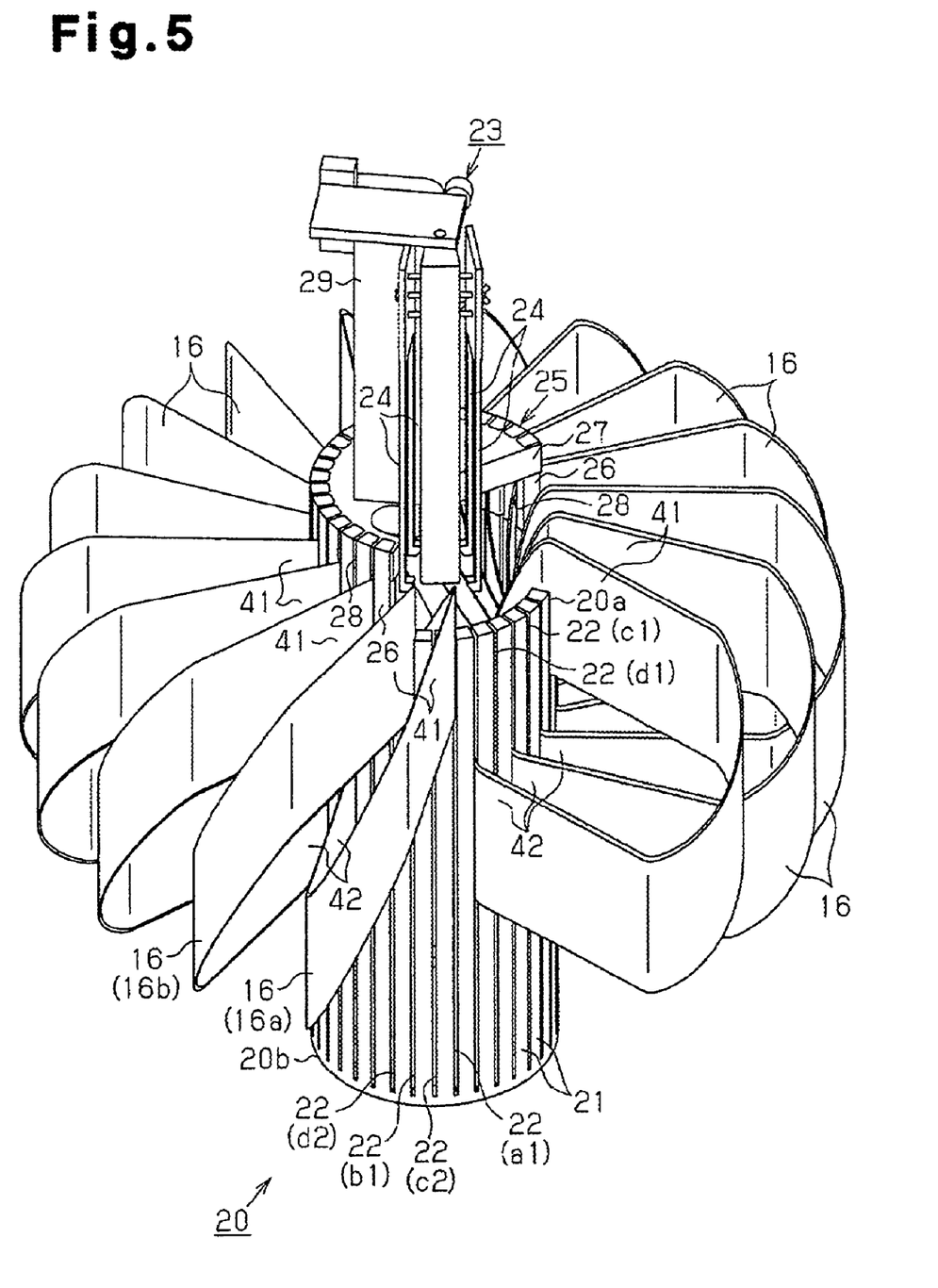
FIG. 5 is a perspective view illustrating a state where a coil shifter is set on the inserting blade of FIG. 4.

FIG. 5 shows a state where the position of a coil shifter 23 is determined with respect to the inserting blade 20. The coil shifter 23 is a coil shifting mechanism for temporarily retracting the first sections 41 of the first and second stator coils 16a, 16b from the inserting blade 20. The coil shifter 23 includes a lid member 25, a rail plate 29, which extends from the lid member 25, movable hooks 24, which reciprocate along the rail plate 29. The lid member 25 is placed on the first end 20a of the inserting blade 20. The lid member 25 permits the slit 22c1, the slit 22d1, the first slit 22a1, the third slit 22c2, the second slit 22b1, and the fourth slit 22d2 to be open, but closes the remaining slits 22. That is, the lid member 25 is a cylinder with a top similar to the second end 20b of the inserting blade 20, and part of the cylinder corresponding to the slit 22c1 to the fourth slit 22d2 is cut out. The lid member 25 includes components 26 and a disk 27 with a cutout, which retains the components 26. The components 26 are shorter than the blade members 21 and are arranged on an arcuate line so that slits 28, which correspond to the slits 22, are defined.

The rail plate 29 extends in the longitudinal direction of the inserting blade 20. The movable hooks 24 reciprocate along the longitudinal direction of the inserting blade 20. In the first embodiment, the number of the movable hooks 24 is four. The movable hooks 24 hook and retain the first sections 41 of the first and second stator coils 16a, 16b.

Figure 6:
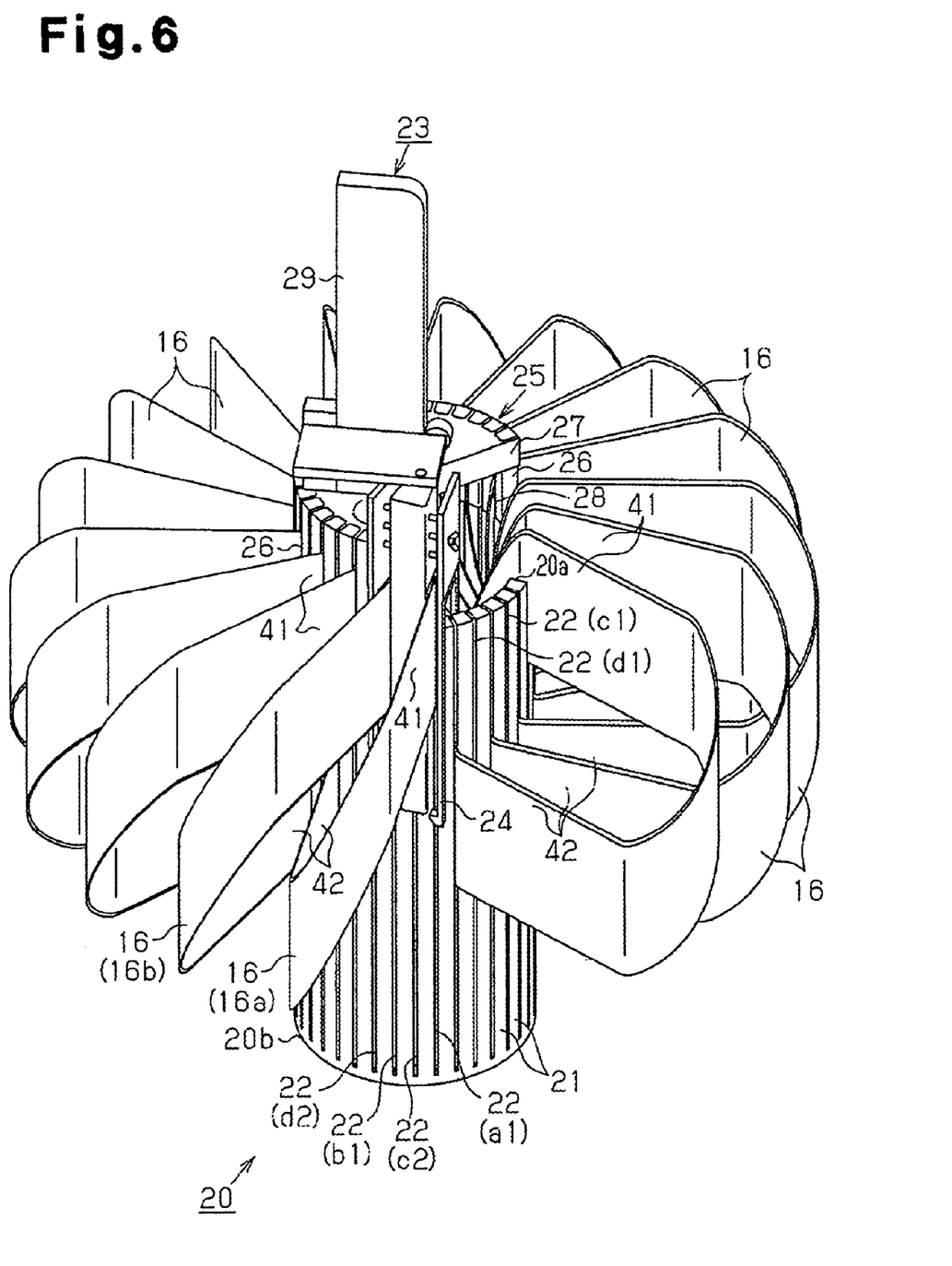
FIG. 6 is a perspective view illustrating a state where the coil shifter retains the first stator coil and the second stator coil shown in FIG. 5.
Figure 7:
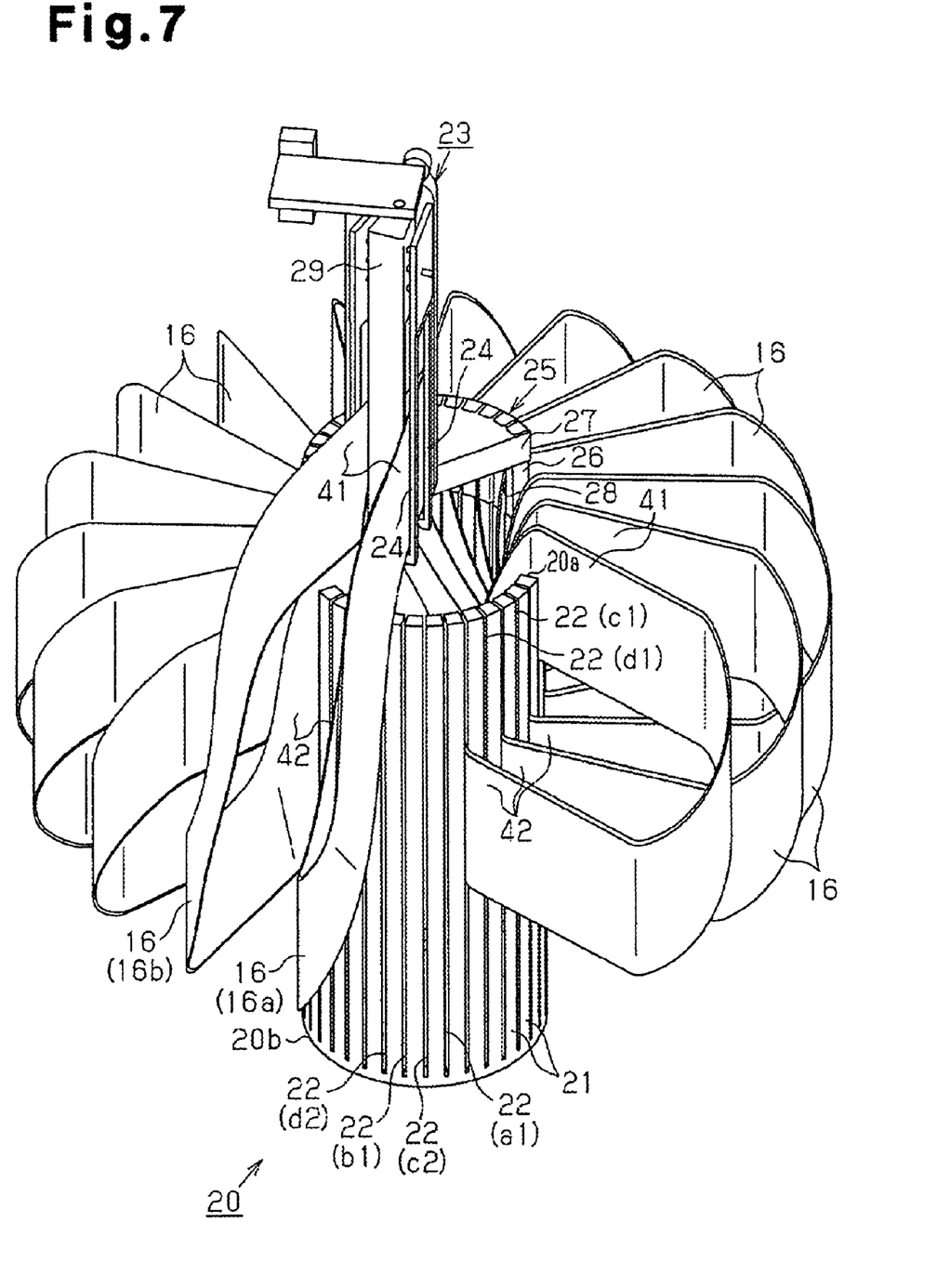
FIG. 7 is a perspective view illustrating a state where the coil shifter lifts the first stator coil and the second stator coil from the inserting blade of FIG. 6.

FIG. 6 shows a state where the movable hooks 24 are moved lower than the first sections 41 of the first and second stator coils 16a, 16b set on the inserting blade 20 to hold the first sections 41. Thereafter, the movable hooks 24 are lifted to hook and retain the first sections 41 of the first and second stator coils 16a, 16b with the movable hooks 24 as shown in FIG. 7. By further lifting the movable hooks 24, the first sections 41 of the first and second stator coils 16a, 16b are removed from the first and second slits 22a1, 22b1. That is, the movable hooks 24 are moved away from the inserting blade 20. Thus, no stator coil 16 is inserted in the first and second slits 22a1, 22b1. As a result, the first sections 41 of the first and second stator coils 16a, 16b are removed from the inserting blade 20 while the second sections 42 of the first and second stator coils 16a, 16b continue to be set on the inserting blade 20.

Figure 8:
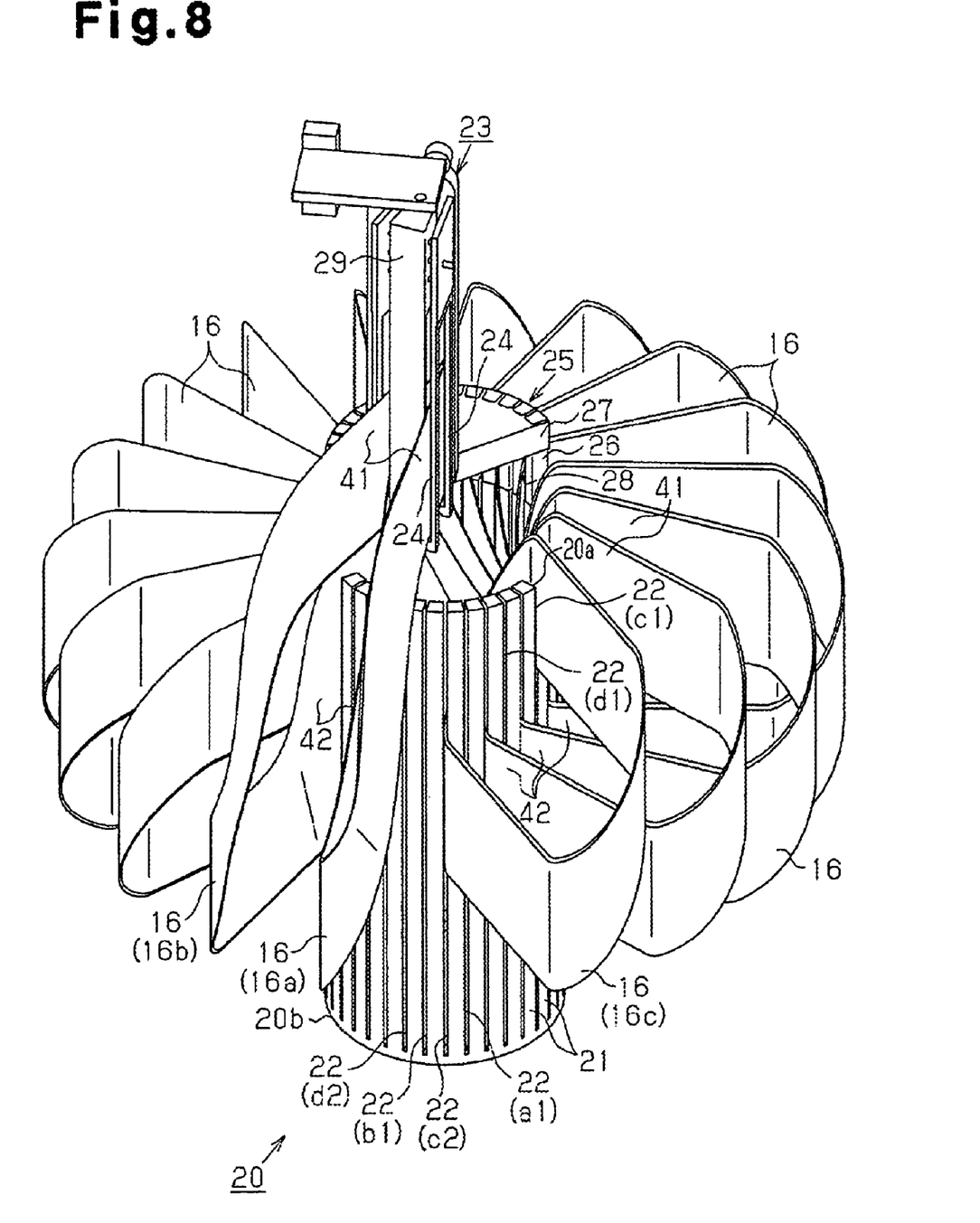
FIG. 8 is a perspective view illustrating a state where the third stator coil is set on the inserting blade of FIG. 7.

Subsequently, as shown in FIG. 8, while maintaining the state where the first section 41 of the first stator coil 16a is retracted from the inserting blade 20, the first section 41 of the third stator coil 16c is inserted in the slit 22c1, and the second section 42 of the third stator coil 16c is inserted in the third slit 22c2. Thus, the second section 42 of the third stator coil 16c is inserted in the third slit 22c2 without interfering with the first stator coil 16a.

Then, as shown in FIG. 9, while maintaining the state where the first sections 41 of the first and second stator coils 16a, 16b are retracted from the inserting blade 20, the first section 41 of the fourth stator coil 16d is inserted in the slit 22d1, and the second section 42 of the fourth stator coil 16d is inserted in the fourth slit 22d2. Thus, the second section 42 of the fourth stator coil 16d is inserted in the fourth slit 22d2 without interfering with the first and second stator coils 16a, 16b.

Figure 10:
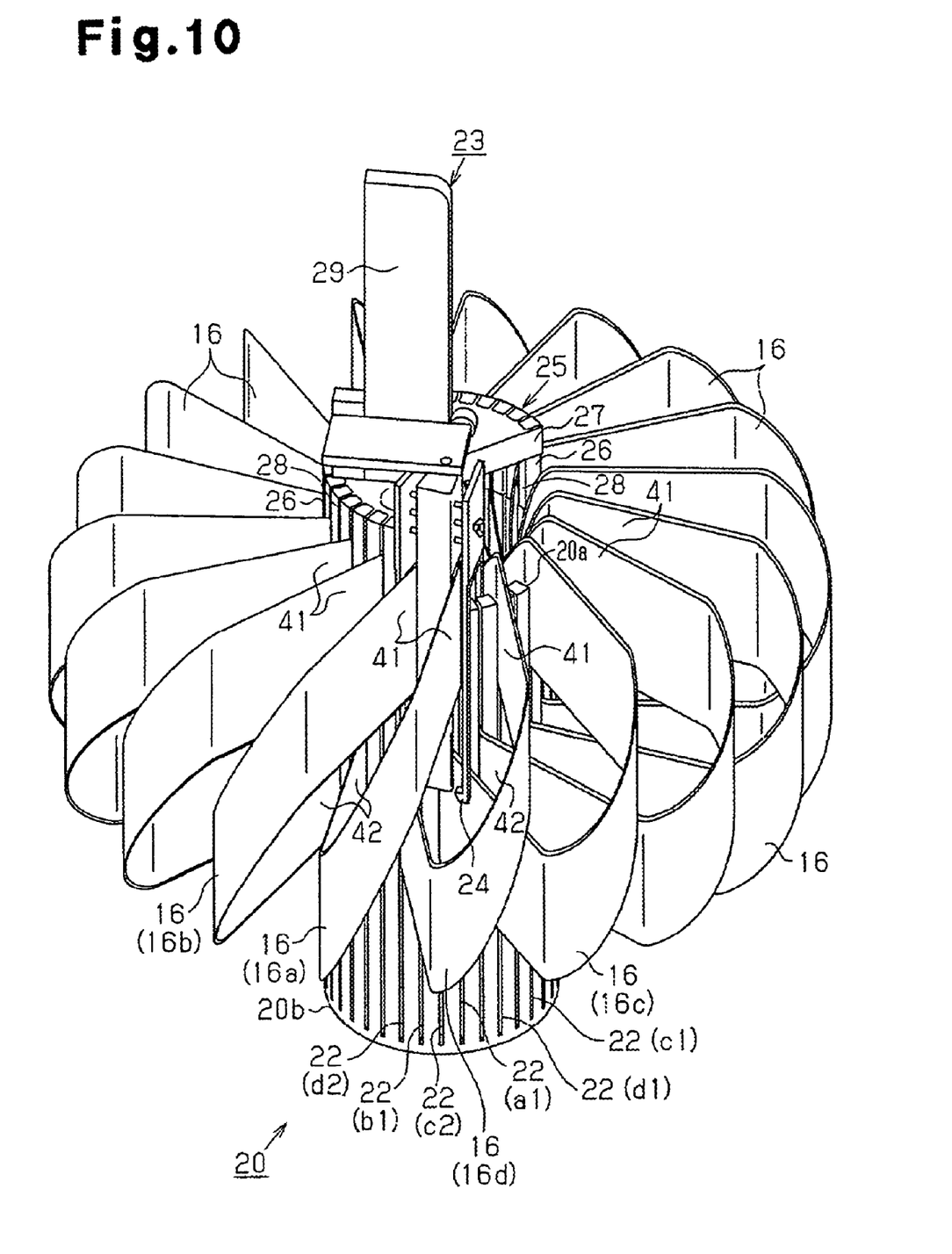
FIG. 10 is a perspective view illustrating a state where the first stator coil and the second stator coil of FIG. 9 are returned to the inserting blade from the coil shifter.

In this manner, after setting the third and fourth stator coils 16c, 16d on the inserting blade 20, the movable hooks 24 are lowered, and the first sections 41 of the first and second stator coils 16a, 16b are returned to the inserting blade 20 as shown in FIG. 10. That is, the first section 41 of the first stator coil 16a is inserted in the first slit 22a1 again, and the first section 41 of the second stator coil 16b is inserted in the second slit 22b1 again. Thereafter, the movable hooks 24 are detached from the first and second stator coils 16a, 16b, and removed from the inserting blade 20. In this manner, all the stator coils 16 are set on the inserting blade 20.

As described above, according to the method of the first embodiment, the first sections 41 and the second sections 42 of the starting stator coils 16a, 16b are temporarily set on the inserting blade 20. Thereafter, the first sections 41 are temporarily removed from the inserting blade 20 while the second sections 42 continue to be set on the inserting blade 20. As a result, the second sections 42 of the third and fourth stator coils 16c, 16d are arranged below the first sections 41 of the first and second stator coils 16a, 16b. In other words, the second sections 42 of the third and fourth stator coils 16c, 16d are arranged further inward than the first sections 41 of the first and second stator coils 16a, 16b.

That is, the third and fourth stator coils 16c, 16d overlap the first and second stator coils 16a, 16b so as to form a spiral shape as a whole. Therefore, the number of the stator coils 16 having the first section 41 that should be temporarily retracted from the inserting blade 20 is determined in accordance with the manner in which the ending stator coils 16c, 16d overlap the starting stator coils 16a, 16b. The overlapping state of the stator coils 16 is determined in accordance with the specification of the electric motor or the rotary machine in which the stator core 11 is mounted. More specifically, the overlapping state of the stator coils 16 is determined in accordance with the interval between the first section 41 and the second section 42 of each stator coil 16, and the interval between adjacent first sections 41.

Figure 11:
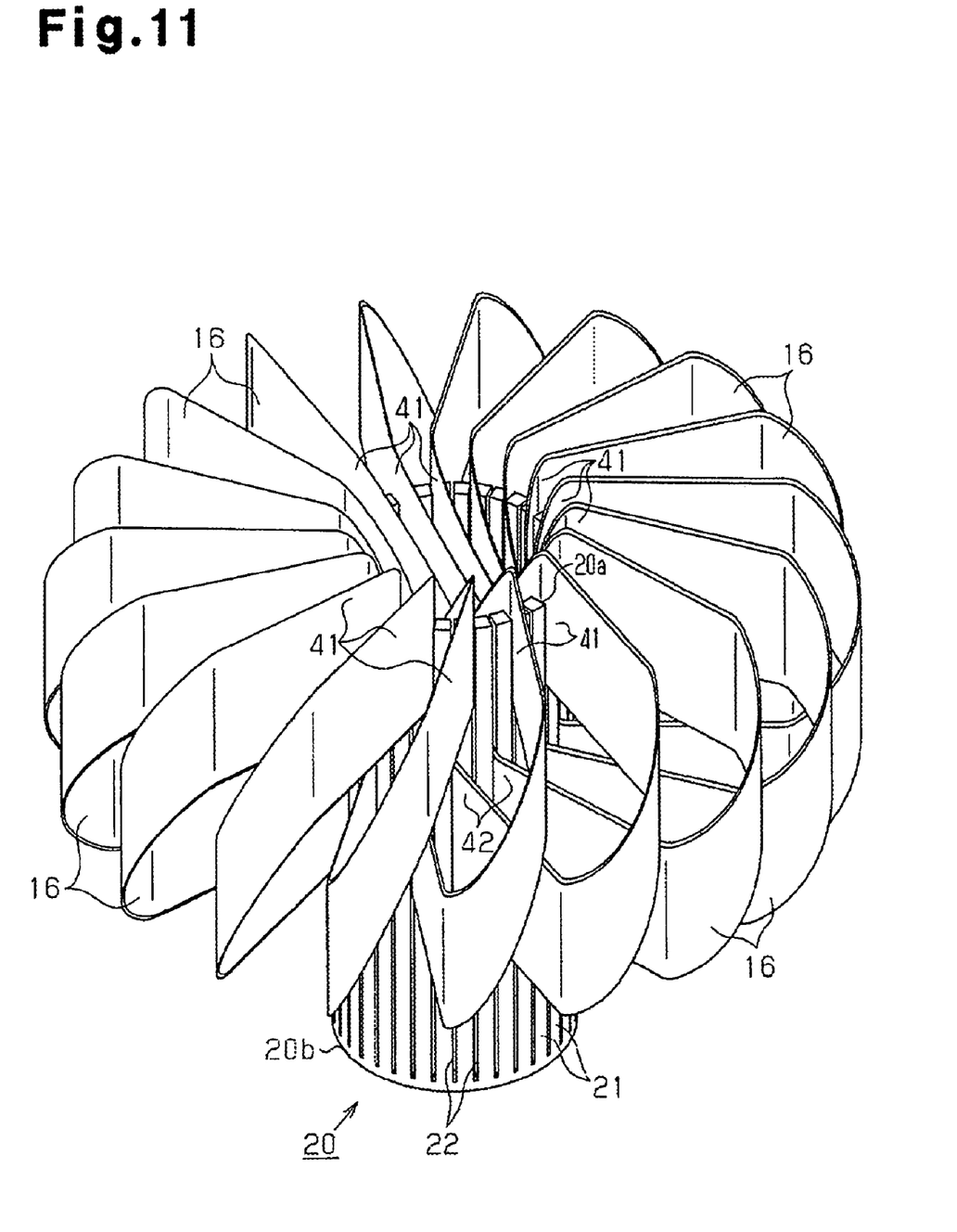
FIG. 11 is a perspective view illustrating a state where the coil shifter is removed from FIG. 10 and all the stator coils are set on the inserting blade.

FIG. 11 shows a state where all the stator coils 16 are set on the inserting blade 20. In this manner, according to the method of the first embodiment, the first sections 41 of the starting stator coils 16a, 16b are lifted from the inserting blade 20. According to the method of the first embodiment, all the stator coils 16 are set on the inserting blade 20 in the same manner. That is, the stator coils 16 set on the inserting blade 20 are uniformly arranged in a state where the stator coils 16 overlap one another to form a spiral shape as a whole.

The inserting blade 20 on which the stator coils 16 are set is mounted on the inserter. The inserter extrudes all the stator coils 16 from the inserting blade 20 to the stator core 11 by a mechanical configuration or an electrical configuration so that the stator coils 16 are mounted on the stator core 11. The stator coils 16 are mounted on the stator core 11 while maintaining the state where the stator coils 16 overlap one another to form a spiral shape.

The first embodiment has the following advantages.

(1) In the state where the first sections 41 of the starting stator coils 16a, 16b are temporarily removed from the inserting blade 20, the ending stator coils 16c, 16d are set on the inserting blade 20 so as to be arranged below the starting stator coils 16a, 16b. Thus, when sequentially setting the stator coils 16 such that the stator coils 16 form a spiral shape as a whole, the ending stator coils 16c, 16d are arranged to overlap the starting stator coils 16a, 16b in the same manner as other stator coils 16. That is, all the stator coils 16 are uniformly arranged to overlap one another to form a spiral shape. Therefore, when mounting the stator coils 16 on the stator core 11 in the state where the stator coils 16 overlap one another to form a spiral shape using the inserter, all the stator coils 16 are uniformly arranged on the stator core 11.

(2) Uniformly arranging all the stator coils 16 suppresses reduction in the efficiency of the rotating electrical machine. Furthermore, since all the stator coils 16 mounted on the integral stator core 11 are uniformly arranged, the reduction in the efficiency of the rotating electric machine is further suppressed.

A second embodiment of the present invention will be described with reference to FIG. 12.

Like or the same reference numerals are given to those components that are like or the same as the corresponding components of the first embodiment, and detailed explanations are omitted.

Figure 12:
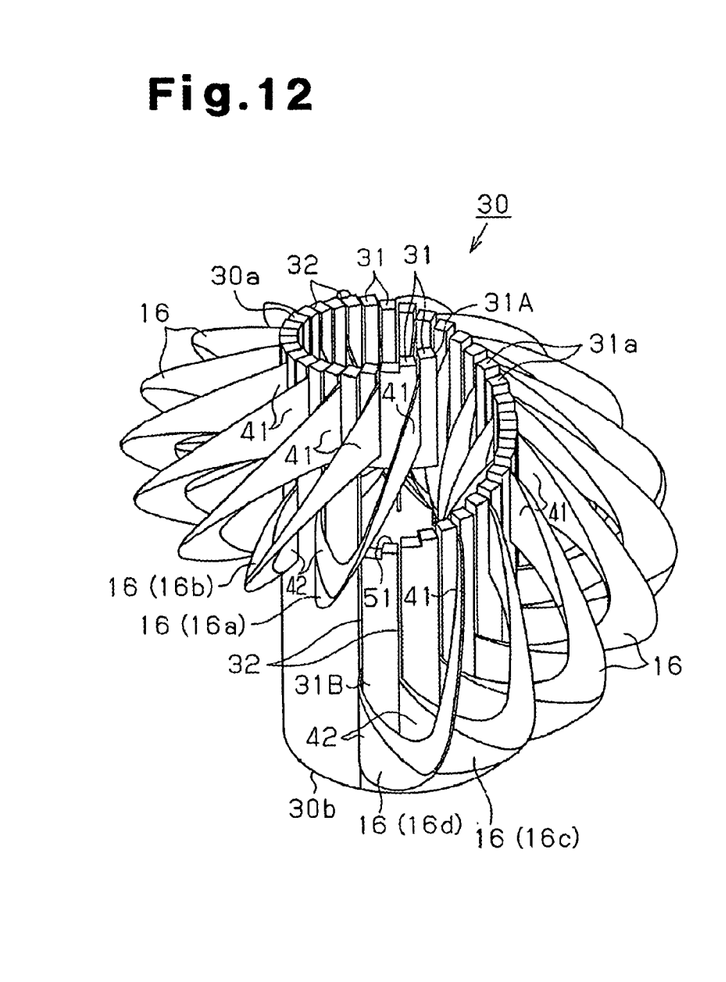
FIG. 12 is a perspective view illustrating a state where all the stator coils are set on a coil setting jig according to a second embodiment of the present invention.

As shown in FIG. 12, the stator coils 16 are set on a coil holder, which is a setting jig 30 in the second embodiment, and are formed to overlap one another in a spiral shape. The stator coils 16 are shifted from the setting jig 30 to the inserting blade 20, which is the same as the first embodiment, to be set on the inserting blade 20.

The coil setting jig, which is the setting jig 30 in the second embodiment, includes long retaining members 31. The coil retaining members, which are the retaining members 31 in the second embodiment, are arranged in an annular shape and form a cylinder as a whole. The diameter of the setting jig 30 is equal to the diameter of the inserting blade 20. Slits 32 are defined between the retaining members 31. In FIG. 12, upper ends 31a of the retaining members 31 are arranged to form a spiral shape. That is, the upper ends 31a are sequentially arranged along the coil setting direction (clockwise) to be displaced downward. Thus, holding positions where the setting jig 30 retains the stator coils 16 are sequentially displaced in the axial direction of the setting jig 30 along the circumferential direction of the setting jig 30. The number of the holding positions is equal to that of the stator coils 16. One stator coil 16 is retained at one holding position. A pair of one first portion 41 and one second portion 42 is retained at each holding position. That is, when the stator coils 16 are set on the setting jig 30 of the second embodiment, a level difference is generated between the holding positions of the adjacent stator coils 16. The stator coils 16 are arranged like spiral stairs.

The arrangement pitch of the slits 32 is twice the arrangement pitch of the slits 22 of the inserting blade 20 in FIG. 2. That is, the number of the slits 32 of the setting jig 30 is half the number of the slits 22 of the inserting blade 20. The distance between the first section 41 and the second section 42 of each stator coil 16 in the second embodiment is the same as that in the first embodiment.

The setting jig 30 includes a cutout 51, which extends along the spiral formed by the upper ends 31a of the retaining members 31. The cutout 51 is located between part of the setting jig 30 that retains the first sections 41 of the first and second stator coils 16a, 16b and part of the setting jig 30 that retains the second sections 42 of the third and fourth stator coils 16c, 16d. In other words, the cutout 51 divides the retaining members 31 corresponding to the second sections 42 of the third and fourth stator coils 16c, 16d into a first retaining portion 31A, which is closer to a first end (upper end) 30a of the setting jig 30, and a second retaining portion 31B, which is closer to a second end (lower end) 30b of the setting jig 30.

Thus, the first sections 41 of the first and second stator coils 16a, 16b retained by the first retaining portion 31A are lifted from the second retaining portion 31B, which retains the second sections 42 of the third and fourth stator coils 16c, 16d. That is, according to the second embodiment, by only setting the first sections 41 of the first and second stator coils 16a, 16b on the first retaining portion 31A, the first sections 41 are arranged at a retracted position from the second retaining portion 31B. Thus, the second sections 42 of the third and fourth stator coils 16c, 16d are set on the setting jig 30 via the cutout 51 without any problem with the first sections 41 of the first and second stator coils 16a, 16b being set on the setting jig 30.

Therefore, by only sequentially setting the stator coils 16 on the setting jig 30 in the coil setting direction (clockwise), the second sections 42 of the third and fourth stator coils 16c, 16d are arranged below (further inward than) the first sections 41 of the first and second stator coils 16a, 16b. As a result, the first and second stator coils 16a, 16b overlap the third and fourth stator coils 16c, 16d in a spiral shape. That is, as shown in FIG. 12, all the stator coils 16 are formed in the same manner to be uniformly arranged in the state where the stator coils 16 overlap one another to form a spiral shape.

After setting all the stator coils 16 on the setting jig 30, the stator coils 16 are set on the inserting blade 20 while maintaining the state where the stator coils 16 overlap one another to form a spiral shape.

When shifting the second sections 42 of the third and fourth stator coils 16c, 16d from the setting jig 30 to the inserting blade 20, the first retaining portion 31A might get in the way. Therefore, the first retaining portion 31A is detachable from the setting jig 30. That is, the retaining members 31 on which the first sections 41 of the first and second stator coils 16a, 16b are set can be detached from the setting jig 30. After the first and second stator coils 16a, 16b shown in FIG. 12 are shifted from the setting jig 30 to the inserting blade 20, the first retaining portion 31A is removed from the setting jig 30. Thus, the third and fourth stator coils 16c, 16d are shifted to the inserting blade 20 without any problem. Thus, the second embodiment has the same advantages as the first embodiment.

A third embodiment of the present invention will now be described with reference to FIG. 13.

Figure 13:
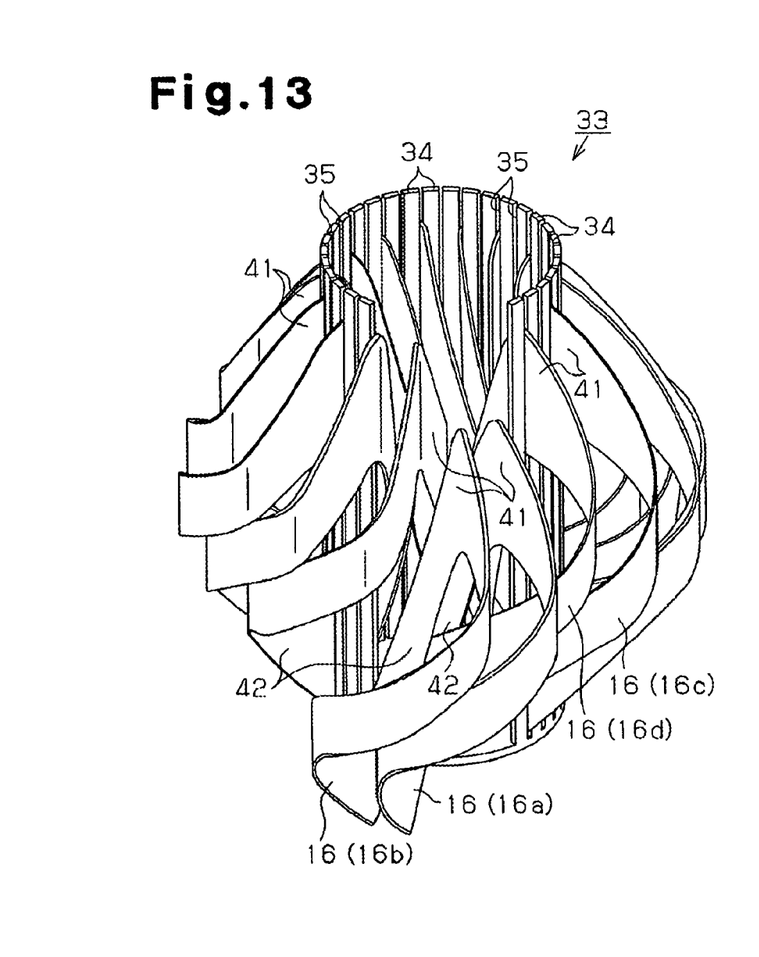
FIG. 13 is a perspective view illustrating a state where all the stator coils are set on an inserting blade according to a third embodiment of the present invention.

FIG. 13 shows an inserting blade 33 of the third embodiment. The inserting blade 33 functions as a coil holder. The stator coils 16 are set on the inserting blade 33 in a state where the stator coils 16 overlap one another to form a spiral shape.

Like the first embodiment, the inserting blade 33 includes coil holding portions, which are long blade members 34. The blade members 34 are arranged in an annular shape to form a cylinder. The blade members 34 are arranged at equal pitches. Slits 35 are defined between adjacent blade members 34. The slits 35 extend in the longitudinal direction (axial direction) of the inserting blade 33.

Some of the blade members 34 are detachably mounted on the inserting blade 33. More specifically, the blade members 34 on which the first sections 41 of the first and second stator coils 16a, 16b are set and the blade members 34 on which the second sections 42 of the third and fourth stator coils 16c, 16d are set are detachable from the inserting blade 33. In FIG. 13, to facilitate the illustration of the first and second stator coils 16a, 16b, the detachable blade members 34 are omitted.

When setting the stator coils 16 on the inserting blade 33, first, the detachable blade members 34 are detached from the inserting blade 33. Thereafter, the stator coils 16 are inserted and sequentially set in predetermined ones of the slits 35. The first section 41 and the second section 42 of each stator coil 16 are separate from each other by predetermined arrangement pitches. The second sections 42 of the first and second stator coils 16a, 16b are inserted in the slits 35, but the first sections 41 of the first and second stator coils 16a, 16b are retained by another holder (not shown). The holder is, for example, a clip that suspends the stator coils 16. That is, the first sections 41 of the first and second stator coils 16a, 16b are lifted from the inserting blade 33, that is, in a retracted state when the third and fourth stator coils 16c, 16d are set on the inserting blade 33.

While the first and second stator coils 16a, 16b are lifted from the inserting blade 33, the third and fourth stator coils 16c, 16d are set on the inserting blade 33. That is, the first sections 41 of the third and fourth stator coils 16c, 16d are inserted in the slits 35, and the second sections 42 of the third and fourth stator coils 16c, 16d are arranged to overlap the first sections 41 of the first and second stator coils 16a, 16b. Thereafter, the detachable blade members 34 are returned to the inserting blade 33. The first sections 41 of the first and second stator coils 16a, 16b and the second sections 42 of the third and fourth stator coils 16c, 16d are arranged in the slits 35 defined by the detachable blade members 34.

The third embodiment has the same advantages as the first embodiment. That is, in the third embodiment, the blade members 34 corresponding to the position where the first and second stator coils 16a, 16b overlap the third and fourth stator coils 16c, 16d are detached from the inserting blade 33 in advance. As a result, the third and fourth stator coils 16c, 16d are arranged below (further inward than) the first and second stator coils 16a, 16b. That is, the first and second stator coils 16a, 16b and the third and fourth stator coils 16c, 16d overlap one another to form a spiral shape. As a result, all the stator coils 16 are uniformly arranged to overlap one another in a spiral shape.

The above embodiments may be modified as follows.

In the above embodiments, the distance between the setting positions of the first section 41 and the second section 42 of each stator coil may be changed. The distance between the setting positions is determined in accordance with the specification of the rotating electric machine as described above.

In the above embodiments, the number of the stator coils 16 set on the inserting blades 20, 33 or the setting jig 30 may be changed. The number of the stator coils 16 is also determined in accordance with the specification of the rotating electric machine.

All the stator coils 16 of the first and third embodiments may be set on the setting jig that is the same as the inserting blades 20, 33. In this case, all the stator coils 16 are shifted from the setting jig to the inserting blade. Also, the stator coils 16 may be set on the inserting blade that is the same as the setting jig 30 according to the second embodiment.

In the first embodiment, the timing at which the first and second stator coils 16a, 16b are lifted from the inserting blade 20 may be changed. The lifting timing may be varied as long as the first sections 41 of the first and second stator coils 16a, 16b are lifted from the inserting blade 20 when the third and fourth stator coils 16c, 16d are set on the inserting blade 20. For example, the first and second stator coils 16a, 16b may be lifted from the inserting blade 20 when the first and second stator coils 16a, 16b are set on the inserting blade 20 or immediately after the first and second stator coils 16a, 16b are set on the inserting blade 20.

In the third embodiment, only the blade members 34 on which the first sections 41 of the first and second stator coils 16a, 16b are set may be detachable from the inserting blade 33. That is, the blade members 34 on which the second sections 42 of the first and second stator coil 16a, 16b are set may continue to be attached to the inserting blade 33.

The invention claimed is:

1. A method for setting a plurality of stator coils on an inserting blade before mounting the stator coils on a stator core using the inserting blade such that the stator coils overlap one another to form a spiral shape, the stator coils including a starting stator coil and an ending stator coil, the method comprising:

setting the stator coils on a coil holder in a predetermined coil setting direction, from the starting stator coil so as to overlap one another, the coil holder being the inserting blade or a setting jig from which stator coils are shifted to the inserting blade, the coil holder including a plurality of coil holding portions to define a plurality of slits arranged at equal pitches in an annular shape, each of the stator coils having a first section and a second section, there being a phase difference between the position of the first section and the second section of the same stator coil on the coil holder, the stator coils being inclined with respect to the axial direction of the coil holder such that the first section of one stator coil overlaps the second section of the next stator coil in the axial direction, and the second section of the next stator coil is inserted inward of the first section of the one stator coil in the axial direction;

before setting the ending stator coil on the coil holder, lifting the first section of the starting stator coil from the coil holder to avoid interference between the first section of the starting stator coil and the second section of the ending stator coil, with the second section of the starting stator coil remaining inserted in the coil holder;

setting the ending stator coil on the coil holder; and after setting the ending stator coil on the coil holder, setting the first section of the starting stator coil on the coil holder.

2. The method according to claim 1, wherein part of the coil holder on which the first section of the starting stator coil is set is detachable from the coil holder, the method further comprising:

detaching the part of the coil holder to lift the first section of the starting stator coil from the coil holder to avoid the interference between the first section of the starting stator coil and the second section of the ending stator coil.

3. A method for setting a plurality of stator coils on an inserting blade before mounting the stator coils on a stator core using the inserting blade such that the stator coils overlap one another to form a spiral shape, the stator coils including a starting stator coil and an ending stator coil, each of the stator coils having a first section and a second section, the method comprising:

providing a coil holder including a plurality of holding positions defining slits arranged at equal pitches in an annular shape, the coil holder being the inserting blade or a setting jig from which stator coils are shifted to the inserting blade, and wherein the holding positions are sequentially arranged in a spiral along a coil setting direction to be displaced in the axial direction of the annularly arranged coil holding portions, the coil holder being formed to have a cutout extending along the spiral, the cutout being located between part of the coil holding portion that retains a first section of the starting stator coil and part of the coil holding portion that retains a second section of the ending stator coil, setting the stator coils on the coil holder sequentially in a predetermined coil setting direction, from the starting stator coil to the ending stator coil so as to overlap one another, there being a phase difference between the position of the first section and the second section of the same stator coil on the coil holder, the stator coils being inclined with respect to the axial direction of the coil holder such that the first section of one stator coil overlaps the second section of the next stator coil in the axial direction, and the second section of the next stator coil is inserted inward of the first section of the one stator coil in the axial direction, after setting all the stator coils on the coil holder, shifting the stator coils from the coil holder to the inserting blade or the stator core while maintaining the state where the stator coils overlap one another to form a spiral shape, after the starting stator coil is shifted from the coil holder to the inserting blade or the stator core, removing part of the setting jig corresponding to the starting stator coil from the setting jig; and shifting the ending stator coil from the coil holder to the inserting blade or the stator core.

* * * * *